No. 789,727. PATENTED MAY 16, 1905.
N. T. HARRINGTON.
TRANSMISSION GEARING.
APPLICATION FILED MAR. 21, 1904.

2 SHEETS—SHEET 1.

Witnesses
Geo. H. Graves
B. C. Smith.

Inventor
Norman T. Harrington
By James Whittemore
Atty.

No. 789,727. PATENTED MAY 16, 1905.
N. T. HARRINGTON.
TRANSMISSION GEARING.
APPLICATION FILED MAR. 21, 1904.

2 SHEETS—SHEET 2.

Witnesses

Inventor
Norman T. Harrington
By James Whittemore
Atty.

No. 789,727. Patented May 16, 1905.

UNITED STATES PATENT OFFICE.

NORMAN T. HARRINGTON, OF DETROIT, MICHIGAN, ASSIGNOR TO OLDS MOTOR WORKS, OF DETROIT, MICHIGAN, A CORPORATION OF MICHIGAN.

TRANSMISSION-GEARING.

SPECIFICATION forming part of Letters Patent No. 789,727, dated May 16, 1905.

Application filed March 21, 1904. Serial No. 199,247.

*To all whom it may concern:*

Be it known that I, NORMAN T. HARRINGTON, a citizen of the United States, residing at Detroit, in the county of Wayne and State of Michigan, have invented certain new and useful Improvements in Transmission-Gearing, of which the following is a specification, reference being had therein to the accompanying drawings.

The invention relates to transmission-gearing of that type known as "planetary;" and it is the object of the invention to secure compactness, strength, and durability and a construction the parts of which may be readily manufactured and easily assembled.

It is a further object to obtain a construction in which all of the differential trains of gearing are inclosed within an oil-tight housing.

The invention consists in the peculiar construction, arrangement, and combination of parts and, further, in the novel construction of the clutch for obtaining high speed and the combination of the same with other parts of the mechanism.

Figure 1:
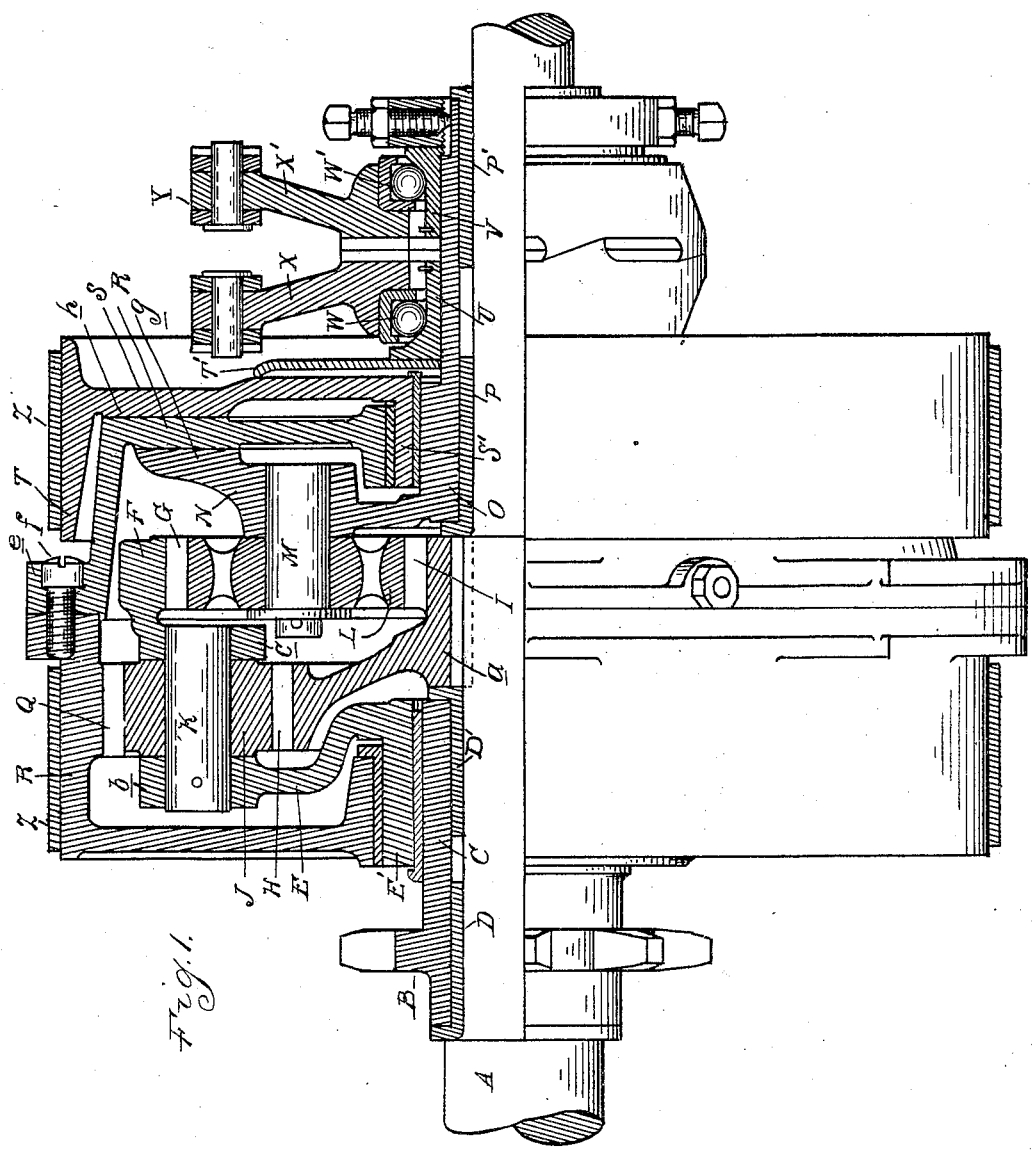
Figure 2:
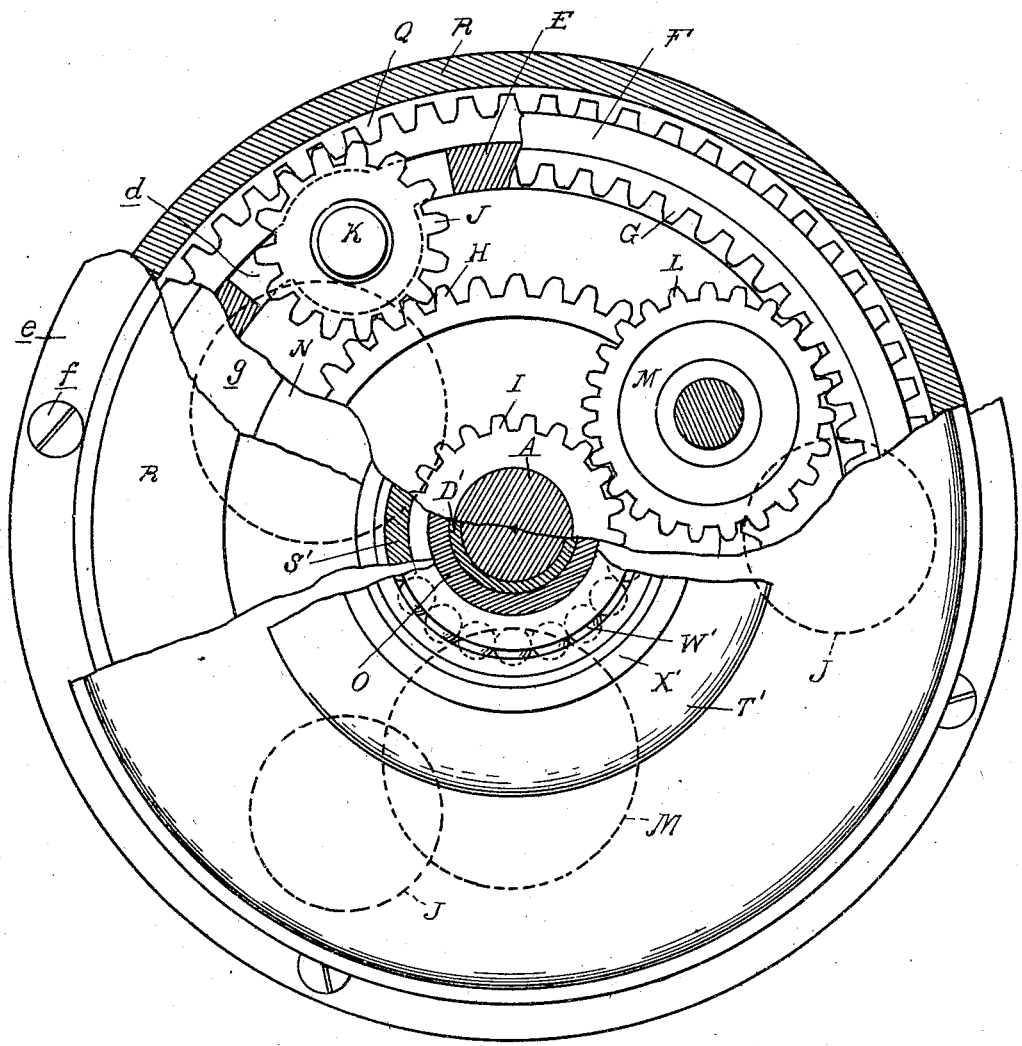

In the drawings, Figure 1 is a longitudinal section through the gearing. Fig. 2 is a cross-section broken away to show different parts of the mechanism.

A is a drive-shaft, and B is the driven wheel revolubly mounted thereon. This driven wheel is preferably formed integral with a sleeve C, which is of considerable length and bears upon the shaft A through the medium of the bushings D and D', arranged at opposite ends thereof.

E is a head mounted upon the sleeve C at the opposite end thereof from the driven wheel B. This head is provided at its periphery with an annular overhanging flange F, having an internal annular rack G near its outer edge.

H and I are two gear-wheels mounted upon the shaft A adjacent to the sleeve C and within the overhanging flange F of the head E. These gears are preferably formed integral and are of different diameter, the smaller gear I being at the outer end and in the plane of the annular rack G. The larger gear H preferably extends inward beyond the end of its hub portion a and into an annular recess in the head E, this construction permitting of elongating the sleeve C and diminishing the amount of overhang of the flange F.

J is a pinion carried by the head E and meshing with the gear-wheel H. This pinion is preferably mounted upon the stub-shaft K, which is secured at opposite ends in bearings b and c within the head E. The periphery of the head is cut away at d for the passage outward of a segment of said pinion. Thus the pinion is arranged to extend partly within and partly without the peripheral flange F of the head. A plurality of the pinions J are distributed around the gear-wheel H and secured to the head E in the manner described.

L is a pinion forming an intermediate between the gear-wheel I and the annular rack G. This pinion is mounted upon the stub-shaft M, secured to and projecting inward from a head N, which is mounted upon the shaft A adjacent to the gear-wheel I. The head N is preferably formed integral with the sleeve O, supported on the shaft by bushings P and P', at opposite ends thereof. A number of the pinions L may be secured to the head N and spaced around the gear-wheel I.

Q is an annular rack surrounding the pinions J and in mesh therewith. This rack is preferably secured to a housing R, which incloses the gear-wheels H and I, pinions J and L, and head N, said housing being revolubly mounted at opposite ends, respectively, on the sleeve E' of the head E and upon the sleeve O. To permit of assembling the parts, the housing R is formed in two sections, which are secured to each other at the periphery by suitable means, such as the flanges e and bolts f.

The head N is formed with an annular face-plate g near its outer edge, which is adapted to bear against a corresponding face on the casing R.

S is a head mounted upon the sleeve O and preferably having a hub S', upon which one end of the casing R is mounted. This head S at its periphery is provided with a flange T, extending inward to overhang the casing R. The head is also provided with the face-plate $h$, which bears upon the casing R opposite the face-plate $g$ on the head N. The members N and S, together with the intermediate portion of the casing R, constitute a friction-clutch which may be coupled by the movement of the members N and S toward each other and released by an opposite movement. This relative movement may be effected by suitable means, such as a rotary cam revoluble upon the sleeve O and having opposite bearings against said sleeve and the member S.

To produce a gradual operation of the clutch, the bearing upon the member S is formed yielding, preferably by arranging a disk T' of resilient material between the head S and a longitudinally-movable collar U on the sleeve O.

V is a fixed collar on the sleeve O, and W and W' are ball-bearings between the collars U and V and two coöperating members X and X'. The adjacent inner faces of these members are cammed, and each is provided with an actuating rock-arm Y and suitable connections by which an opposite rocking movement may be imparted to the members X and X'. This will cause the cammed faces to move the collar U inward, bearing against the resilient member T', which yieldingly presses the head S toward the head N, clamping the casing R between.

From the construction described it will be understood that the gearing comprises two trains, each of which consists of a gear-wheel attached to the shaft, a planetary pinion meshing therewith, and a surrounding annular rack. It will be further seen that the planetary pinion of one train and the rack of the other train are held in fixed relation by being connected to the common head E and that the latter is secured to the driven wheel B. Furthermore, the other rack and planetary pinion of the two trains, while secured to members revolubly independent of the shaft A and driven wheel B, may be coupled to each other through the medium of the friction-faces on the heads N and S and intermediate portion of the casing R. Inasmuch as the rack Q and the head N are revolved differentially by the actuation of the gear-wheels H and I and planetary pinions J and L, it is evident that the effect of locking said rack Q and head N together will be to lock the entire mechanism, so that all the parts will revolve with the shaft A and without any relative movement of the gears. When the clutch is released, the driven wheel B may be revolved either in the same or reverse direction from the rotation of the shaft A and at different speed therefrom by arresting one or the other of the controlling members of the two trains—namely, the rack Q and the head N, on which the planetary pinions L are mounted. When the rack Q is arrested, which may be accomplished by a peripheral brake Z on the casing R, the pinions J will be compelled to travel around the same through the actuation of the gear-wheel H, rotating in the same direction, but at a slower angular speed than the shaft A. On the other hand, when the head N is arrested, which may be accomplished through the medium of the head S, feathered upon the sleeve O, and the peripheral brake Z' and engaging the flange T of said head, the wheel B will be driven in the reverse direction. This reverse movement is effected through the medium of the pinions L, which revolve around the stationary axes and convert the movement imparted thereto by the gear-wheel I into rotation of the rack G in the opposite direction from that of the shaft.

Inasmuch as the rotation of a planetary gear is always considerably slower than that of its actuating-gear, it is desirable to make the difference in speed as small as possible. This is accomplished by making the gear-wheel H as large and the planetary pinions J as small as is practicable, while maintaining the proper strength of the parts. On the other hand, the reverse movement imparted to the driven wheel being through the medium of stationary pinions intermediate the gear-wheel I and annular rack G, the movement imparted to said driven wheel will be much faster than the planetary movement with the same parts. It is therefore desirable to proportion the gears so as to make the reverse drive as slow as practicable. These results are obtained by the arrangement illustrated in the drawings, in which the pitched diameter of the gear-wheel I is but slightly greater than the hub $a$, while the gear-wheel H, as before stated, is of greater diameter. The effect is to arrange the axes of the pinions L considerably nearer the axes of the shaft A than the axes of the pinions J. The rack G is formed with as great a diameter as will permit of its being arranged within the housing R with the necessary clearance.

The casing R, which carries the rack Q, is provided with bearings, which are separated from each other a considerable distance, and these bearings are suitably bushed, so as to form practically oil-tight joints. These joints are both near the center, and the joint between the flanges $e$ at the periphery being oil-tight it is evident that the oil cannot be thrown out by centrifugal action.

What I claim as my invention is—

1. In a planetary transmission-gearing the combination with two differential gear-trains each comprising a central gear-wheel, a planetary pinion, and a surrounding annular rack, of a common head carrying the planetary pinion of one train, and the annular rack of the other train, means for independently arresting the movement of the other rack, and the planetary movement of the other pinion, and means for locking the same together.

2. In a planetary transmission-gearing, the combination with a shaft and a driven member revoluble thereon, of two differential gear-trains comprising central gear-wheels fixed to said shaft planetary pinions engaging said gears and annular racks surrounding said pinions and gears, of a revoluble head fixed to said driven wheel and carrying the annular rack of one of said trains, and the planetary pinion of the other train, and a housing inclosing both trains and carrying the other annular rack.

3. In a planetary transmission-gearing the combination with a shaft, a driven member revoluble thereon, and two differential gear-trains each comprising a central gear secured to said shaft, a coöperating planetary pinion, and a surrounding annular rack, of a head secured to said driven member carrying the annular rack of one train and the planetary pinion of the other train, a housing inclosing both trains carrying the other annular rack, a head carrying the other planetary pinion, means for independently arresting said head and said housing, and means for clamping the same together.

4. In a planetary transmission-gearing the combination with a shaft and a driven member mounted thereon, of two differential gear-trains each comprising a central gear-wheel mounted on said shaft with the coöperating planetary pinion, and a surrounding annular rack, of a head secured to said driven wheel carrying the planetary pinion of one train and the annular rack of the other train, a housing inclosing both trains and carrying the other annular rack, a head carrying the other planetary pinion within said housing, and having a sleeve extending without said housing, another head without said housing mounted upon said sleeve in longitudinally-movable but revolubly-fixed relation thereto, means for relatively moving said heads toward or from each other to clamp or release the intermediate wall of the housing, and means for independently arresting said sleeve and housing from rotary movement.

5. In a transmission-gearing the combination with a shaft, a driven wheel revoluble thereon, two differential gear-trains each comprising a central gear-wheel fixed to said shaft, a coöperating planetary pinion and surrounding annular rack, of a head secured to said driven wheel and carrying the planetary pinion of one train and the annular rack of the other train, a housing inclosing both trains and carrying the other annular rack, the heads arranged within and without said housing adjacent to one wall thereof, and in relatively longitudinally movable, but rotatably fixed relation to each other, a hub on said inner head projecting outward from the housing, a revoluble cam on said hub, and a resilient member actuated by said cam, and bearing against said outer head, whereby said inner and outer heads may be yieldingly clamped against the intermediate wall of the casing.

6. A transmission-gearing comprising a drive and a driven member, a plurality of differential planetary gear-trains between said drive and driven members, a clutch for coupling said drive and driven members, and a housing inclosing said differential gear-trains and clutch.

7. A transmission-gearing comprising a drive and a driven member, a plurality of gear-trains connected to said drive and driven members, and a housing inclosing said trains and connected to a revoluble member of one train, a member within said housing adapted to frictionally engage therewith, and connected to a differential moving member of the other train, whereby the frictional engagement of said member and housing will lock both trains.

8. A transmission-gearing comprising concentric revoluble drive and driven members, gear-trains connected therewith, a housing inclosing said trains and connected to a revoluble member of one train a member adapted to frictionally engage with the inner wall of said housing and connected to another revoluble member of said trains, and means external to said housing for moving said member into frictional engagement with said housing.

9. A transmission-gearing comprising concentric revoluble drive and driven members, a plurality of planetary gear-trains connecting said drive and driven members, a housing surrounding said gear-trains and having inwardly-extending walls on opposite sides thereof, said housing being connected to a revoluble member of one train, a head forming a revoluble member of the other train within said housing, and having a frictional face adjacent to one of the inward-extending walls of said housing and a sleeve extending centrally out from said housing, a head longitudinally sliding but revolubly fixed on said sleeve adjacent to the outer face of said inwardly-extending wall, and means for clamping said inner and outer heads against the intervening wall of said housing, whereby said gear-trains are locked.

In testimony whereof I affix my signature in presence of two witnesses.

NORMAN T. HARRINGTON.

Witnesses:
 JAS. P. BARRY,
 H. C. SMITH.